United States Patent Office 3,637,832
Patented Jan. 25, 1972

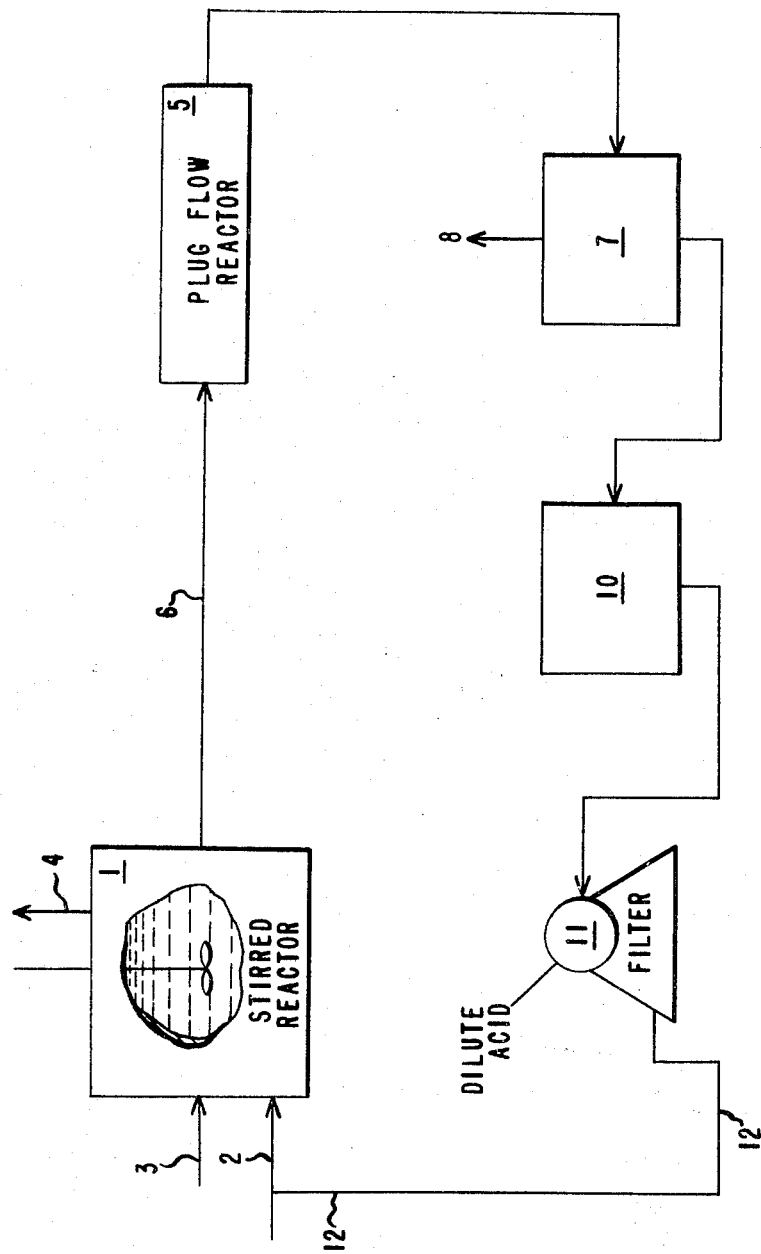

3,637,832
PREPARATION OF STRAIGHT CHAIN DICARBOXYLIC ACIDS
Jesse Oris White, Orange, and Darwin Darrell Davis, Victoria, Tex., assignors to E. I. du Pont de Nemours and Company, Wilmington, Del.
Filed Mar. 12, 1968, Ser. No. 712,542
Int. Cl. C07c *51/28, 55/02, 55/20*
U.S. Cl. 260—531 R                5 Claims

ABSTRACT OF THE DISCLOSURE

A $C_8$–$C_{12}$ dicarboxylic acid which can be readily refined to high purity is produced by conducting an oxidation of an alcohol and a ketone with all of the reactants in the liquid phase and after substantially all of the alcohol and ketone have been oxidized maintaining the oxidate in the liquid phase under oxidizing conditions at a temperature in the range 90 to 110° C. for a time in the range 3 to 60 minutes.

---

In the art relating to the oxidation of ketones and alcohols to dicarboxylic acids and in particular to the oxidation of cyclododecanol and cyclododecanone to 1,12-dodecanedioic acid, considerable effort has been directed to the developing processes which produce good quality acids in high yields. The present invention is directed toward the preparation of $C_8$–$C_{12}$ dicarboxylic acids, and specifically 1,12-dodecanedioic acid by conducting the oxidation process such that all of the reactants remain in the liquid phase and after substantially all of the ketone and alcohol have been oxidized maintaining the oxidate under oxidizing conditions at an elevated temperature in order to permit the decomposition of certain organic nitrogenous impurities thereby permitting the recovery of an acid which is readily refined to high purity and which because of its purity produces substantially colorless polyamides.

Part of the prior art has disclosed processes for the purification of dicarboxylic acids by washing, e.g. the process described in French Pats. 1,393,568 and 1,393,569. Part is directed specifically to reducing organonitrogen containing impurities. French Pat. 1,354,782 describes a process for hydrolysis of 6-nitro-hydroxyiminohexanoic acid as a technique for eliminating this nitrogen-containing intermediate. In the present process for the preparation of $C_8$–$C_{12}$ dicarboxylic acids, and particularly 1,12-dodecanedioic acid, hydrolysis of the oxidate will not convert the most troublesome organo-nitrogen containing intermediates.

It has been discovered in accordance with the present invention that a carefully controlled oxidation of ketone and alcohol, e.g. cycloundecanol, cycloundecanone, cyclodecanol, cyclodecanone, cyclododecanol, cyclododecanone, cyclononal, cyclononanone, cyclooctanol and cyclooctanone, followed by a selective oxidation of some of the by-products is necessary to reduce or eliminate the organonitrogen impurities and to produce an acid of potentially superior quality.

A more complete understanding of the present invention may be had by referring to the schematic drawing attached hereto and made a part of this specification. Nitric acid and catalyst are introduced into stirred reactor 1 via line 2. The compounds to be oxidized, usually an alcohol and/or a ketone, are introduced via line 3. The gaseous effluent which consists of carbon oxides, nitrogen oxides, water, ketone and small amounts of alcohol and nitric acid are directed to a suitable recovery system via line 4. The liquid is discharged from the reactor 1 into reactor 5 via line 6. Reactor 5 is preferably operated under conditions of plug flow. The effluent from reactor 5 is then directed to a gas liquid separator 7 wherein carbon oxides, nitrogen oxides, water and nitric acid are removed via line 8. Liquid is directed towards a crystallizer 10 where most of the acid crystallizes. Solids are removed via filter 11 and the mother liquor is returned to the constant environment reactor 1 via line 12. The nitric acid which is present in the dibasic acid obtained from crystallizer 11 can be removed by washing in a manner similar to the techniques described in French Pats. 1,393,568 and 1,393,569. The oxidation is conducted at a temperature in the range of from 75 to 120° C., and preferably at a temperature in the range 85 to 105° C. and is advantageously operated from below atmospheric pressure up to 4 atmospheres absolute with 1 to 2 atmospheres being preferred.

An important feature of the present invention is the maintenance of the reactants in a homogeneous condition, i.e. in a substantially liquid phase, both during the oxidation of the ketone and alcohol and during the oxidation of the nitrogenous impurities formed concomitantly with the acid. At pressures at or above atmospheric, temperatures above 110° C. may be tolerated momentarily; however, degradation of the dicarboxylic acids occurs at temperatures in excess of 110° C., and for this reason temperatures above the aforementioned are not suggested either for the oxidation or the subsequent refining of the oxidate.

The following examples are presented to illustrate and not to restrict the present invention. Parts and percentages are by weight unless otherwise specified.

EXAMPLES 1–8

A stirred pot reactor equipped with an overflow arranged to give a holdup of approximately 350 ml. of liquid in the pot was fed continuously with 55 percent by weight aqueous nitric acid at room temperature and at a rate sufficient to obtain the residence time indicated in Table I.

TABLE I

| | Agitated reactor | | | Plug flow reactor | | |
|---|---|---|---|---|---|---|
| | Temperature (° C.) | Residence time (min.) | DNL[1] in effluent (percent by weight) | Temperature (° C.) | Residence time (min.) | DNL[1] in effluent (percent by weight) |
| Comparison A | 75 | 14.5 | 2.9 | 104 | 9 | 0.59 |
| Example: | | | | | | |
| 1 | 98 | 30 | 0.29 | 104 | 19 | 0.05 |
| 2 | 98 | 14.5 | 0.82 | 104 | 9 | 0.16 |
| 3[2] | 98 | 14.5 | 0.78 | 104 | 9 | 0.22 |
| 4[2] | 85 | 14.5 | 1.00 | 104 | 9 | 0.28 |
| 5[2] | 75 | 14.5 | 0.81 | 104 | 9 | 0.21 |
| 6 | 98 | 30 | 0.45 | 104 | 19 | 0.10 |
| 7 | 85 | 30 | 0.46 | 104 | 19 | 0.11 |
| 8 | 75 | 30 | 0.59 | 104 | 19 | 0.10 |

[1] ω,ω-Dinitrolauric acid.
[2] The nitric acid feed contained 25% by weight glacial acetic acid.

A molten mixture of approximately 80 percent by weight cyclododecanol and 20 percent by weight cyclododecanone at a temperature of 90 to 95° C. was introduced into the reactor at a rate of 1 volume of the aforesaid mixture to ten volumes of the aqueous nitric acid. Both the alcohol and the ketone were at least 96% pure. The overflow was directed to a second reactor which was a vertically disposed glass cylinder arranged to accept feed at the bottom and to discharge by overflow through a standpipe at the top. The reactor held 125 ml. of liquid and operated with plug flow. The temperature of the contents of the reactor was controlled by a steam or cooling water coil. When steady state conditions had been achieved, the composition of the stream from the stirred pot reactor and from the plug flow reactor were analyzed for the present of $\omega,\omega$-dinitrolauric acid. This acid is a known color former in 1,12-dodecanedioic acid and in polyamide salts prepared therefrom. The dinitrolauric acid is analyzed by dissolving an appropriate size sample in a 1:1 mixture of 1,4-dioxane and dilute sodium hydroxide, scanning the ultraviolet spectrum in the 340–450 m$\mu$ range, and measuring the absorbance at 380–385 m$\mu$ vs. the solvent blank. Calibration curves were established by analyzing standard samples prepared from pure $\alpha,\alpha$-dinitrocyclododecanone or $\omega,\omega$-dinitrolauric acid, since these materials are considered equivalent. Comparison A is an oxidation conducted at a temperature at which the acid which is produced forms as a solid in a slurry in the first reactor. The comparison demonstrates that a high level of nitrogenous impurities are produced by such an operation and that the impurities are not readily reduced even after maintaining the oxidate at an elevated temperature according to the process of the present invention.

Examples 1 and 2 demonstrate the operation of a temperature of 98° C. which maintains a completely liquid phase during the oxidation of the ketone and alcohol and during the subsequent oxidative reaction of the dinitrolauric acid in the plug flow reactor. The advantages of operation in the liquid phase are apparent from these examples.

Examples 3, 4, and 5 clearly demonstrate the advantages obtained when all reactants are maintained in a liquid state. In each of these examples, the nitric acid feed contained 25% by weight glacial acetic acid to render the produced acid soluble in the reaction medium at the temperature employed.

Examples 6, 7 and 8 are presented to show the benefits of residence time in the plug flow reactor regardless of the temperature of the oxidation in the stirred pot and its effect in reducing the amount of lauric acid derivative in the final product.

EXAMPLE 9

This example illustrates the ability of the present process to reduce nitrogenous impurities. The same equipment as set forth in Examples 1 through 8 was employed for this experiment. The stirred pot reactor was run continously by introducing 1.75 cc./minute of cyclododecanol and 18.08 cc./minute of 55% by weight aqueous nitric acid while maintaining the temperature at 85° C. in order to obtain a composition in the reactor having a high level of organic nitrogenous impurities. When the repeated sampling indicated that a steady state condition was achieved, the flow of feed nitric acid and cyclododecanol was stopped and the temperature of the reactor immediately raised to 103° C. Samples of the reactor contents were withdrawn at intervals and quenched by adding the sample to dioxane and at temperatures of 0 to 5° C. The samples were then analyzed for $\omega,\omega$-dinitrolauric acid and $\alpha,\alpha$-dinitrocyclododecanone. The results are set forth in Table II.

TABLE II

| Time (minutes): | Percent nitro impurities based upon the sample (weight) |
|---|---|
| 0 | [1] 2.79 |
| 1 | 2.18 |
| 3 | 1.68 |
| 6 | 1.12 |
| 9 | 0.73 |
| 15 | 0.24 |
| 25 | 0.06 |

[1] Steady state value.

EXAMPLE 10

To a glass reaction vessel equipped with mechanical agitator, heating and cooling coil, thermometer, reflux condenser and bottom draw-off was charged 10 parts by volume of 55% $HNO_3$ containing 0.1% vanadium and 0.3% copper by weight. The charge was heated to 98° C. and 1.25 parts by volume of a molten mixture of cyclododecanol - cyclododecanone (approximately 5/1 ratio) was added by dropping funnel at rate of 0.04 part per minute while maintaining the temperature at 98–9° C. Upon completion of the addition, the temperature of the mixture was maintained at 98–9° C. for two minutes, then the mixture was quickly drained into a crystallization vessel, where the temperature was dropped to 60° C. over a 30 minute period. The resulting slurry was filtered on a suction filter and washed on the filter with 6 parts $H_2O$, followed by slurrying with 10 parts water and refiltering. The final cake was melt extracted twice with 6 parts water per extraction at 120° C., followed by drying at 95–100° C. under vacuum. The resulting product was analyzed for color and total nitrogen with the results shown in Table III as Procedure A. The total nitrogen was obtained by known techniques. The color of the acid was determined by reflectance measurements (according to the general procedure of AST D–1925–63T) taken on solid cakes cast from molten acid. This color number can be correlated with the ultimate color of polyamides prepared from the acids.

The preceeding example was repeated with the following modification. Upon completion of addition of the alcohol-ketone, the temperature was immediately raised to 102–3° C. and held there for 15 minutes. The product was then treated in exactly the same manner as in Procedure A with the results shown in Table III as Procedure B.

The cake obtained in Procedure B following water washing on the filter was redissolved in 5.25 parts by volume of 55% nitric acid containing a minor amount of urea, cooled slowly (thirty minutes) to 75° C. and filtered. This cake was washed, melt extracted, and dried as in Procedures A and B. The quality is shown in Table III as Procedure C.

TABLE III.—EXAMPLE 10

| | Product quality | |
|---|---|---|
| | Color | Total nitrogen (p.p.m.) |
| Procedure: | | |
| A | 5.7 | 469 |
| B | 0.96 | 85.7 |
| C | 0 | 8.3 |

It should be readily apparent from the foregoing examples that the process of the present invention produces an acid which is remarkably superior in color to acid produced by prior art techniques. The acid produced by the present process is readily refined to acid of extraordinary high purity especially with respect to color and nitrogenous impurities, two factors which are critical in the manufacture of acceptable polymer from the acid.

We claim:
1. A process for the preparation of straight chain alkene dicarboxylic acids having 8–12 carbon atoms which acids are substantially free from organic nitrogeneous impurities which comprises contacting a cyclic compound selected from the group consisting of cyclic alcohols and ketones having 8–12 carbon atoms with aqueous nitric acid having a concentration of 40 to 60 percent by weight based upon the total water and acid at a temperature in the range 75 to 120° C. and a pressure up to 7 atmospheres absolute, maintaining the reactants in the liquid phase during said preparation and after substantially all of said cyclic compound has reacted, maintaining the oxidate under oxidizing conditions at a temperature in the range 90 to 110° C. for a period of 3 minutes to 60 minutes, and thereafter recovering dicarboxylic acids substantially free from nitrogenous impurities.

2. A process for the preparation of $C_8$–$C_{12}$ alkane dicarboxylic acids substantially free from organic nitrogenous impurities which comprises contacting a mixture of compounds selected from the class consisting of cyclic alcohols and ketones having 8–12 carbon atoms with aqueous nitric acid maintained at a concentration in the range 45 to 55 percent by weight based upon the total water and acid at a temperature in the range 85 to 105° C. and a pressure in the range 1 to 2 atmospheres in the presence of a catalyst comprising copper and vanadium, maintaining the reactants in the liquid phase during said preparation and after substantially all of said alcohol and said ketone have reacted maintaining the resultant oxidate at a temperature in the range 100 to 106° C. for a period of 5 to 25 minutes and thereafter recovering acids by cooling the oxidate to precipitate said acids and recrystallizing the acid thus precipitated from an aqueous nitric acid.

3. A process for the preparation of substantially pure 1,12-dodecanedioic acid free from organic nitrogenous impurities which process comprises contacting a mixture of cyclododecanol and cyclododecanone with aqueous nitric acid maintained at a concentration of 45 to 55 percent by weight based upon the total water and acid at a temperature in the range 85 to 105° C. and a pressure in the range to 1 to 2 atmospheres in the presence of a catalyst comprising copper and vanadium, maintaining the reactants in a liquid phase during said preparation after substantially all of said alcohol and ketone have been reacted maintaining the resultant oxidate at a temperature in the range 100 to 106° C. for a period of 3 to 60 minutes and thereafter recovering 1,12-dodecanedioic acids substantially free from nitrogenous impurities.

4. The process of claim 3 wherein said acid is recovered from the oxidate by cooling to precipitate the acids and recrystallization of the precipitate from an aqueous solution of nitric acid.

5. The process of claim 4 wherein the aqueous solution of nitric acid which is employed to recrystallize contains a minor amount of urea.

References Cited

UNITED STATES PATENTS

| | | | |
|---|---|---|---|
| 2,191,786 | 2/1940 | Aronow | 260—531 |
| 2,557,282 | 6/1951 | Hamblet et al. | 260—531 |
| 3,112,340 | 11/1963 | Fuchs | 260—531 |

OTHER REFERENCES

Vogel: Practical Organic Chemistry, 3rd ed., 1956, p. 442.

LORRAINE A. WEINBERGER, Primary Examiner

R. S. WEISSBERG, Assistant Examiner

U.S. Cl. X.R.

260—537 P

PO-1050
(5/69)

UNITED STATES PATENT OFFICE
CERTIFICATE OF CORRECTION

Patent No. 3,637,832      Dated Jan. 25, 1972

Inventor(s) Jesse Oris White and Darwin Darrell Davis

It is certified that error appears in the above-identified patent and that said Letters Patent are hereby corrected as shown below:

Column 4, line 75, "alkene" should be --alkane--.
Column 6, line 8, after "preparation" add --and--.

Signed and sealed this 25th day of July 1972.

(SEAL)
Attest:

EDWARD M. FLETCHER, JR.          ROBERT GOTTSCHALK
Attesting Officer                Commissioner of Patents